United States Patent
Lung

(10) Patent No.: US 12,299,597 B2
(45) Date of Patent: May 13, 2025

(54) RECONFIGURABLE AI SYSTEM

(71) Applicant: MACRONIX INTERNATIONAL CO., LTD., Hsinchu (TW)

(72) Inventor: Hsiang-Lan Lung, Ardsley, NY (US)

(73) Assignee: MACRONIX INTERNATIONAL CO., LTD., Hsinchu (TW)

(*) Notice: Subject to any disclaimer, the term of this patent is extended or adjusted under 35 U.S.C. 154(b) by 833 days.

(21) Appl. No.: 17/459,356

(22) Filed: Aug. 27, 2021

(65) Prior Publication Data

US 2023/0067190 A1 Mar. 2, 2023

(51) Int. Cl.
G06N 5/04 (2023.01)
G06F 9/30 (2018.01)
G06F 11/22 (2006.01)

(52) U.S. Cl.
CPC .......... *G06N 5/04* (2013.01); *G06F 9/30003* (2013.01); *G06F 11/2263* (2013.01)

(58) Field of Classification Search
CPC .............................. G06N 5/04; G06F 9/30003
See application file for complete search history.

(56) References Cited

U.S. PATENT DOCUMENTS

| | | |
|---|---|---|
| 4,219,829 A | 8/1980 | Dorda et al. |
| 4,987,090 A | 1/1991 | Hsu et al. |
| 5,029,130 A | 7/1991 | Yeh |
| 5,586,073 A | 12/1996 | Hiura et al. |
| 5,963,803 A | 10/1999 | Dawson et al. |
| 6,034,882 A | 3/2000 | Johnson et al. |
| 6,107,882 A | 8/2000 | Gabara et al. |
| 6,313,486 B1 | 11/2001 | Kencke et al. |
| 6,385,097 B1 | 5/2002 | Liao et al. |
| 6,486,027 B1 | 11/2002 | Noble et al. |
| 6,593,624 B2 | 7/2003 | Walker |
| 6,829,598 B2 | 12/2004 | Milev |
| 6,856,542 B2 | 2/2005 | Roy et al. |

(Continued)

FOREIGN PATENT DOCUMENTS

| | | |
|---|---|---|
| CN | 101432821 A | 5/2009 |
| CN | 1998012 B | 11/2010 |

(Continued)

OTHER PUBLICATIONS

Goplen et al., "Placement of 3D ICs with Thermal and Interlayer Via Considerations," 2007 44th ACM/IEEE Design Automation Conference, Jun. 4-8, 2007, pp. 626-631.

(Continued)

*Primary Examiner* — Beau D Spratt
(74) *Attorney, Agent, or Firm* — Andrew L. Dunlap; Haynes Beffel & Wolfeld LLP

(57) ABSTRACT

A system in package platform includes a processor chip having a runtime processor core, an accelerator core and a processor-memory interface exposed on a chip-to-chip bonding surface, a first memory chip such as 3D NAND flash memory storing a collection of executable models of inference engines, and a second memory chip storing weights of a selected executable model. The second memory chip can comprise a nonvolatile, random access memory, such as phase change memory. Direct vertical connections such as via-to-via connections, are provided between the processor chip and the second memory chip.

16 Claims, 3 Drawing Sheets

(56) References Cited

U.S. PATENT DOCUMENTS

| | | |
|---|---|---|
| 6,906,940 B1 | 6/2005 | Lue |
| 6,960,499 B2 | 11/2005 | Nandakumar et al. |
| 7,081,377 B2 | 7/2006 | Cleeves |
| 7,089,218 B1 | 8/2006 | Visel |
| 7,129,538 B2 | 10/2006 | Lee et al. |
| 7,177,169 B2 | 2/2007 | Scheuerlein |
| 7,368,358 B2 | 5/2008 | Ouyang et al. |
| 7,436,723 B2 | 10/2008 | Rinerson et al. |
| 7,593,908 B2 | 9/2009 | Abdulkader et al. |
| 7,646,041 B2 | 1/2010 | Chae et al. |
| 7,747,668 B2 | 6/2010 | Nomura et al. |
| 7,948,024 B2 | 5/2011 | Kim et al. |
| 8,045,355 B2 | 10/2011 | Ueda |
| 8,154,128 B2 | 4/2012 | Lung |
| 8,203,187 B2 | 6/2012 | Lung et al. |
| 8,275,728 B2 | 9/2012 | Pin |
| 8,331,149 B2 | 12/2012 | Choi et al. |
| 8,432,719 B2 | 4/2013 | Lue |
| 8,564,045 B2 | 10/2013 | Liu |
| 8,589,320 B2 | 11/2013 | Breitwisch et al. |
| 8,630,114 B2 | 1/2014 | Lue |
| 8,725,670 B2 | 5/2014 | Visel |
| 8,860,124 B2 | 10/2014 | Lue et al. |
| 9,064,903 B2 | 6/2015 | Mitchell et al. |
| 9,111,617 B2 | 8/2015 | Shim et al. |
| 9,147,468 B1 | 9/2015 | Lue |
| 9,177,966 B1 | 11/2015 | Rabkin et al. |
| 9,213,936 B2 | 12/2015 | Visel |
| 9,379,129 B1 | 6/2016 | Lue et al. |
| 9,391,084 B2 | 7/2016 | Lue |
| 9,397,110 B2 | 7/2016 | Lue |
| 9,401,371 B1 | 7/2016 | Lee et al. |
| 9,430,735 B1 | 8/2016 | Vali et al. |
| 9,431,099 B2 | 8/2016 | Lee et al. |
| 9,520,485 B2 | 12/2016 | Lue |
| 9,524,980 B2 | 12/2016 | Lue |
| 9,535,831 B2 | 1/2017 | Jayasena et al. |
| 9,536,969 B2 | 1/2017 | Yang et al. |
| 9,589,982 B1 | 3/2017 | Cheng et al. |
| 9,698,156 B2 | 7/2017 | Lue |
| 9,698,185 B2 | 7/2017 | Chen et al. |
| 9,710,747 B2 | 7/2017 | Kang et al. |
| 9,747,230 B2 | 8/2017 | Han et al. |
| 9,754,953 B2 | 9/2017 | Tang et al. |
| 9,767,028 B2 | 9/2017 | Cheng et al. |
| 9,898,207 B2 | 2/2018 | Kim et al. |
| 9,910,605 B2 | 3/2018 | Jayasena et al. |
| 9,922,716 B2 | 3/2018 | Hsiung et al. |
| 9,978,454 B2 | 5/2018 | Jung |
| 9,983,829 B2 | 5/2018 | Ravimohan et al. |
| 9,991,007 B2 | 6/2018 | Lee et al. |
| 10,037,167 B2 | 7/2018 | Kwon et al. |
| 10,043,819 B1 | 8/2018 | Lai et al. |
| 10,056,149 B2 | 8/2018 | Yamada et al. |
| 10,073,733 B1 | 9/2018 | Jain et al. |
| 10,157,012 B2 | 12/2018 | Kelner et al. |
| 10,175,667 B2 | 1/2019 | Bang et al. |
| 10,211,218 B2 | 2/2019 | Lue |
| 10,242,737 B1 | 3/2019 | Lin et al. |
| 10,381,376 B1 | 8/2019 | Nishikawa et al. |
| 10,403,637 B2 | 9/2019 | Lue |
| 10,528,643 B1 | 1/2020 | Choi et al. |
| 10,534,840 B1 | 1/2020 | Petti |
| 10,540,591 B2 | 1/2020 | Gao et al. |
| 10,552,759 B2 | 2/2020 | Rich |
| 10,565,494 B2 | 2/2020 | Henry et al. |
| 10,635,398 B2 | 4/2020 | Lin et al. |
| 10,643,713 B1 | 5/2020 | Louie et al. |
| 10,719,296 B2 | 7/2020 | Lee et al. |
| 10,777,566 B2 | 9/2020 | Lue |
| 10,783,963 B1 | 9/2020 | Hung et al. |
| 10,790,023 B2 | 9/2020 | Harari |
| 10,790,828 B1 | 9/2020 | Gunter et al. |
| 10,825,510 B2 | 11/2020 | Jaiswal et al. |
| 10,860,682 B2 | 12/2020 | Knag et al. |
| 10,880,994 B2 | 12/2020 | Aoki et al. |
| 10,910,393 B2 | 2/2021 | Lai et al. |
| 10,942,673 B2 | 3/2021 | Shafiee Ardestani et al. |
| 10,957,392 B2 | 3/2021 | Lee et al. |
| 11,069,704 B2 | 7/2021 | Lai et al. |
| 11,127,108 B2 | 9/2021 | Sharma et al. |
| 11,181,115 B2 | 11/2021 | Manipatruni et al. |
| 11,410,028 B2 | 8/2022 | Crill et al. |
| 11,443,407 B2 | 9/2022 | Sharma et al. |
| 11,694,940 B1 * | 7/2023 | Mathuriya ............... G06F 1/329 257/295 |
| 12,086,410 B1 | 9/2024 | Mathuriya et al. |
| 2001/0055838 A1 | 12/2001 | Walker et al. |
| 2002/0028541 A1 | 3/2002 | Lee et al. |
| 2003/0122181 A1 | 7/2003 | Wu |
| 2005/0088878 A1 | 4/2005 | Eshel |
| 2005/0280061 A1 | 12/2005 | Lee |
| 2005/0287793 A1 | 12/2005 | Blanchet et al. |
| 2007/0158736 A1 | 7/2007 | Arai et al. |
| 2008/0101109 A1 | 5/2008 | Haring-Bolivar et al. |
| 2008/0117678 A1 | 5/2008 | Shieh et al. |
| 2009/0097321 A1 | 4/2009 | Kim et al. |
| 2009/0184360 A1 | 7/2009 | Jin et al. |
| 2010/0172189 A1 | 7/2010 | Itagaki et al. |
| 2010/0182828 A1 | 7/2010 | Shima et al. |
| 2010/0202208 A1 | 8/2010 | Endo et al. |
| 2010/0270593 A1 | 10/2010 | Lung et al. |
| 2011/0018051 A1 | 1/2011 | Kim et al. |
| 2011/0063915 A1 | 3/2011 | Tanaka et al. |
| 2011/0106742 A1 | 5/2011 | Pino |
| 2011/0128791 A1 | 6/2011 | Chang et al. |
| 2011/0140070 A1 | 6/2011 | Kim |
| 2011/0194357 A1 | 8/2011 | Han et al. |
| 2011/0286258 A1 | 11/2011 | Chen et al. |
| 2011/0297912 A1 | 12/2011 | Samachisa et al. |
| 2012/0007167 A1 | 1/2012 | Hung et al. |
| 2012/0044742 A1 | 2/2012 | Narayanan |
| 2012/0112264 A1 | 5/2012 | Lee et al. |
| 2012/0182801 A1 | 7/2012 | Lue |
| 2012/0235111 A1 | 9/2012 | Osano et al. |
| 2012/0254087 A1 | 10/2012 | Visel |
| 2013/0070528 A1 | 3/2013 | Maeda |
| 2013/0075684 A1 | 3/2013 | Kinoshita et al. |
| 2013/0119455 A1 | 5/2013 | Chen et al. |
| 2014/0043898 A1 | 2/2014 | Kuo et al. |
| 2014/0063949 A1 | 3/2014 | Tokiwa |
| 2014/0119127 A1 | 5/2014 | Lung et al. |
| 2014/0149773 A1 | 5/2014 | Huang et al. |
| 2014/0268996 A1 | 9/2014 | Park |
| 2014/0330762 A1 | 11/2014 | Visel |
| 2015/0008500 A1 | 1/2015 | Fukumoto et al. |
| 2015/0170001 A1 | 6/2015 | Rabinovich et al. |
| 2015/0171106 A1 | 6/2015 | Suh |
| 2015/0179661 A1 | 6/2015 | Huo et al. |
| 2015/0199126 A1 | 7/2015 | Jayasena et al. |
| 2015/0331817 A1 | 11/2015 | Han et al. |
| 2015/0340369 A1 | 11/2015 | Lue |
| 2016/0043100 A1 | 2/2016 | Lee et al. |
| 2016/0141299 A1 | 5/2016 | Hong |
| 2016/0141337 A1 | 5/2016 | Shimabukuro et al. |
| 2016/0181315 A1 | 6/2016 | Lee et al. |
| 2016/0232973 A1 | 8/2016 | Jung |
| 2016/0247579 A1 | 8/2016 | Ueda et al. |
| 2016/0308114 A1 | 10/2016 | Kim et al. |
| 2016/0329341 A1 | 11/2016 | Shimabukuro et al. |
| 2016/0336064 A1 | 11/2016 | Seo et al. |
| 2016/0342892 A1 | 11/2016 | Ross |
| 2016/0342893 A1 | 11/2016 | Ross et al. |
| 2016/0343421 A1 | 11/2016 | Pyo |
| 2016/0358661 A1 | 12/2016 | Vali et al. |
| 2016/0379115 A1 | 12/2016 | Burger et al. |
| 2017/0003889 A1 | 1/2017 | Kim et al. |
| 2017/0025421 A1 | 1/2017 | Sakakibara et al. |
| 2017/0084748 A1 | 3/2017 | Yang |
| 2017/0092370 A1 | 3/2017 | Harari |
| 2017/0103316 A1 | 4/2017 | Ross et al. |
| 2017/0123987 A1 | 5/2017 | Cheng et al. |
| 2017/0148517 A1 | 5/2017 | Harari |
| 2017/0160955 A1 | 6/2017 | Jayasena et al. |

(56) References Cited

U.S. PATENT DOCUMENTS

| | | |
|---|---|---|
| 2017/0169885 A1 | 6/2017 | Tang et al. |
| 2017/0169887 A1 | 6/2017 | Widjaja |
| 2017/0243879 A1 | 8/2017 | Yu et al. |
| 2017/0263623 A1 | 9/2017 | Zhang et al. |
| 2017/0270405 A1 | 9/2017 | Kurokawa |
| 2017/0287928 A1 | 10/2017 | Kanamori et al. |
| 2017/0309634 A1 | 10/2017 | Noguchi et al. |
| 2017/0316833 A1 | 11/2017 | Ihm et al. |
| 2017/0317096 A1 | 11/2017 | Shin et al. |
| 2017/0337466 A1 | 11/2017 | Bayat et al. |
| 2018/0113649 A1 | 4/2018 | Shafiee Ardestani et al. |
| 2018/0121790 A1 | 5/2018 | Kim et al. |
| 2018/0129424 A1 | 5/2018 | Confalonieri et al. |
| 2018/0129936 A1 | 5/2018 | Young et al. |
| 2018/0144240 A1 | 5/2018 | Garbin et al. |
| 2018/0157488 A1 | 6/2018 | Shu et al. |
| 2018/0173420 A1 | 6/2018 | Li et al. |
| 2018/0182776 A1 | 6/2018 | Kim |
| 2018/0189640 A1 | 7/2018 | Henry et al. |
| 2018/0240522 A1 | 8/2018 | Jung |
| 2018/0246783 A1 | 8/2018 | Avraham et al. |
| 2018/0247195 A1 | 8/2018 | Kumar et al. |
| 2018/0285726 A1* | 10/2018 | Baum ................ G06N 3/02 |
| 2018/0286874 A1 | 10/2018 | Kim et al. |
| 2018/0321942 A1 | 11/2018 | Yu et al. |
| 2018/0342299 A1 | 11/2018 | Yamada et al. |
| 2018/0350823 A1 | 12/2018 | Or-Bach et al. |
| 2019/0019538 A1 | 1/2019 | Li et al. |
| 2019/0019564 A1 | 1/2019 | Li et al. |
| 2019/0035449 A1 | 1/2019 | Saida et al. |
| 2019/0043560 A1 | 2/2019 | Sumbul et al. |
| 2019/0050714 A1 | 2/2019 | Nosko et al. |
| 2019/0065151 A1 | 2/2019 | Chen et al. |
| 2019/0073564 A1 | 3/2019 | Saliou |
| 2019/0073565 A1 | 3/2019 | Saliou |
| 2019/0088329 A1 | 3/2019 | Tiwari et al. |
| 2019/0102170 A1 | 4/2019 | Chen et al. |
| 2019/0138891 A1* | 5/2019 | Kim ................ G06N 3/08 |
| 2019/0138892 A1 | 5/2019 | Kim et al. |
| 2019/0148393 A1 | 5/2019 | Lue |
| 2019/0164044 A1 | 5/2019 | Song et al. |
| 2019/0164617 A1 | 5/2019 | Tran et al. |
| 2019/0213234 A1 | 7/2019 | Bayat et al. |
| 2019/0220249 A1 | 7/2019 | Lee et al. |
| 2019/0244662 A1 | 8/2019 | Lee et al. |
| 2019/0286419 A1 | 9/2019 | Lin et al. |
| 2019/0311243 A1 | 10/2019 | Whatmough et al. |
| 2019/0311749 A1 | 10/2019 | Song et al. |
| 2019/0325959 A1 | 10/2019 | Bhargava et al. |
| 2019/0340497 A1 | 11/2019 | Baraniuk et al. |
| 2019/0349426 A1 | 11/2019 | Smith et al. |
| 2019/0363131 A1 | 11/2019 | Torng et al. |
| 2020/0026993 A1 | 1/2020 | Otsuka |
| 2020/0034148 A1 | 1/2020 | Sumbul et al. |
| 2020/0065650 A1 | 2/2020 | Tran et al. |
| 2020/0098784 A1 | 3/2020 | Nagashima et al. |
| 2020/0098787 A1 | 3/2020 | Kaneko |
| 2020/0110990 A1 | 4/2020 | Harada et al. |
| 2020/0117986 A1 | 4/2020 | Burr et al. |
| 2020/0118638 A1 | 4/2020 | Leobandung et al. |
| 2020/0143248 A1 | 5/2020 | Liu et al. |
| 2020/0160165 A1 | 5/2020 | Sarin |
| 2020/0227432 A1 | 7/2020 | Lai et al. |
| 2020/0334015 A1 | 10/2020 | Shibata et al. |
| 2020/0343252 A1 | 10/2020 | Lai et al. |
| 2020/0349093 A1 | 11/2020 | Malladi et al. |
| 2020/0365611 A1 | 11/2020 | Hung et al. |
| 2020/0381450 A1 | 12/2020 | Lue et al. |
| 2020/0395309 A1* | 12/2020 | Cheah ................ H01L 25/0655 |
| 2020/0402997 A1 | 12/2020 | Ahn et al. |
| 2021/0125042 A1* | 4/2021 | Han ................ G06N 3/063 |
| 2021/0168230 A1* | 6/2021 | Baker ................ G06F 1/1698 |
| 2021/0209468 A1 | 7/2021 | Matsumoto et al. |
| 2021/0240945 A1 | 8/2021 | Strachan et al. |
| 2022/0284657 A1 | 9/2022 | Müller et al. |
| 2023/0101654 A1 | 3/2023 | Nava Rodriguez et al. |
| 2023/0153587 A1* | 5/2023 | Vogelsang ............ G11C 5/025 706/25 |
| 2024/0064044 A1 | 2/2024 | Liu |

FOREIGN PATENT DOCUMENTS

| | | |
|---|---|---|
| CN | 103778468 A | 5/2014 |
| CN | 105718994 A | 6/2016 |
| CN | 105789139 A | 7/2016 |
| CN | 106530210 A | 3/2017 |
| CN | 106815515 A | 6/2017 |
| CN | 107077879 A | 8/2017 |
| CN | 107368892 A | 11/2017 |
| CN | 107533459 A | 1/2018 |
| CN | 107767905 A | 3/2018 |
| CN | 108268946 A | 7/2018 |
| CN | 110598752 A | 12/2019 |
| EP | 2048709 A2 | 4/2009 |
| JP | H0451382 A | 2/1992 |
| JP | 2006127623 A | 5/2006 |
| JP | 2009080892 A | 4/2009 |
| TW | 201108230 A | 3/2011 |
| TW | 201523838 A | 6/2015 |
| TW | 201618284 A | 5/2016 |
| TW | 201639206 A | 11/2016 |
| TW | 201715525 A | 5/2017 |
| TW | 201732824 A | 9/2017 |
| TW | 201741943 A | 12/2017 |
| TW | 201802800 A | 1/2018 |
| TW | 201807807 A | 3/2018 |
| TW | 201822203 A | 6/2018 |
| TW | 201939717 A | 10/2019 |
| TW | 202004573 A | 1/2020 |
| TW | 202011285 A | 3/2020 |
| TW | 202046179 A | 12/2020 |
| TW | 202103307 A | 1/2021 |
| TW | 202122994 A | 6/2021 |
| TW | 202129509 A | 8/2021 |
| WO | 2012009179 A1 | 1/2012 |
| WO | 2012015450 A1 | 2/2012 |
| WO | 2016060617 A1 | 4/2016 |
| WO | 2016084336 A1 | 6/2016 |
| WO | 2017091338 A1 | 6/2017 |
| WO | 2018201060 A1 | 11/2018 |

OTHER PUBLICATIONS

Tanaka et al., "Through-Silicon via Interconnection for 3D Integration Using Room-Temperature Bonding," in IEEE Transactions on Advanced Packaging, vol. 32, No. 4, Nov. 2009, pp. 746-753.

Temiz, et al., "Post-CMOS Processing and 3-D Integration Based on Dry-Film Lithography," in IEEE Transactions on Components, Packaging and Manufacturing Technology, vol. 3, No. 9, Sep. 2013, pp. 1458-1466.

TW Exam Report from 110137775 family member application, English Machine Translation, dated May 18, 2022, 7 pages.

Anonymous, "Data in the Computer", May 11, 2015, pp. 1-8, https://web.archive.org/web/20150511143158/https://homepage.cs.uri.edu/faculty/wolfe/book/Readings/Reading02.htm (Year: 2015)—See Office Action dated Aug. 17, 2020 in U.S. Appl. No. 16/279,494 for relevance—no year provided by examiner.

Aritome, et al., "Reliability issues of flash memory cells," Proc. of the IEEE, vol. 81, No. 5, May 1993, pp. 776-788.

Beasley, "Manufacturing Defects," may be found at https://slideplayer.com/slide/11407304, downloaded May 20, 2020, 61 pages.

Chen et al., "A Highly Pitch Scalable 3D Vertical Gate (VG) NAND Flash Decoded by a Novel Self-Aligned Independently Controlled Double Gate (IDG) StringSelect Transistor (SSL)," 2012 Symp. on VLSI Technology (VLSIT), Jun. 12-14, 2012, pp. 91-92.

Chen et al., "Eyeriss: An Energy-Efficient reconfigurable accelerator for deep convolutional neural networks," IEEE ISSCC, Jan. 31-Feb. 4, 2016, 3 pages.

Choi et al., "Performance Breakthrough in NOR Flash Memory with Dopant-Segregated Schottky-Barrier (DSSB) SONOS Device", 2009 Symposium on VLSI Technology Digest of Technical Papers, Jun. 16-18, 2009, pp. 1-2.

(56) References Cited

OTHER PUBLICATIONS

Entegris FAQ Series, "Contamination Control in Ultrapure Chemicals and Water: Fundamentals of Contamination Control," may be found at https://www.entegris.com/en/home/resources/technical-information/faq/contamination-control-in-ultrapure-chemicals-and-water.html., downloaded May 20, 2020, 10 pages.

Fukuzumi et al. "Optimal Integration and Characteristics of Vertical Array Devices for Ultra-High Density, Bit-Cost Scalable Flash Memory," IEEE Dec. 2007, pp. 449-452.

Gonugondla et al., "Energy-Efficient Deep In-memory Architecture for NAND Flash Memories," IEEE International Symposium on Circuits and Systems (ISCAS), May 27-30, 2018, 5 pages.

Guo et al., "Fast, energy-efficient, robust, and reproducible mixed-signal neuromorphic classifier based on embedded NOR flash memory technology," IEEE Int'l Electron Devices Mtg., San Francisco, CA, Dec. 2-6, 2017, 4 pages.

Hsu et al., "Study of Sub-30nm Thin Film Transistor (TFT) Charge-Trapping (CT) Devices for 3D NAND Flash Application," 2009 IEEE, Dec. 7-9, 2009, pp. 27.4.1-27.4.4.

Hubert et al., "A Stacked SONOS Technology, Up to 4 Levels and 6nm Crystalline Nanowires, With Gate-All-Around on Independent Gates (Flash), Suitable for Full 3D Integration," IEEE 2009, Dec. 7-9, 2009, pp. 27.6.1-27.6.4.

Hung et al., "A highly scalable vertical gate (VG) 3D NAND Flash with robust program disturb immunity using a novel PN diode decoding structure," 2011 Symp. on VLSI Technology (VLSIT), Jun. 14-16, 2011, pp. 68-69.

IMEC Magazine, Mar. 2018, 35 pages.

Jang et al., "Vertical Cell Array Using TCAT (Terabit Cell Array Transistor) Technology for Ultra High Density NAND Flash Memory," 2009 Symposium on VLSI Technology Digest of Technical Papers, Jun. 16-18, 2009, pp. 192-193.

Johnson et al., "512-Mb PROM With a Three-Dimensional Array of Diode/Antifuse Memory Cells," IEEE Journal of Solid-State Circuits, vol. 38, No. 11, Nov. 2003, pp. 1920-1928.

Jung et al., "Three Dimensionally Stacked NAND Flash Memory Technology Using Stacking Single Crystal Si Layers on ILD and TANOS Structure for Beyond 30nm Node," International Electron Devices Meeting, 2006. IEDM '06, Dec. 11-13, 2006, pp. 1-4.

Katsumata et al., "Pipe-shaped BiCS flash memory with 16 stacked layers and multi-level-cell operation for ultra high density storage devices," 2009 Symp. on VLSI Technology, Jun. 16-18, 2009, 2 pages.

Kim et al. "Novel Vertical-Stacked-Array-Transistor (VSAT) for Ultra-High-Density and Cost-Effective NAND Flash Memory Devices and SSD (Solid State Drive)", Jun. 2009 Symposium on VLSI Technolgy Digest of Technical Papers, pp. 186-187. (cited in parent—not provided herewith).

Kim et al., "Multi-Layered Vertical Gate NAND Flash Overcoming Stacking Limit for Terabit Density Storage," 2009 Symposium on VLSI Technology Digest of Technical Papers, Jun. 16-18, 2009, pp. 188-189.

Kim et al., "Novel 3-D Structure for Ultra High Density Flash Memory with VRAT (Vertical-Recess-Array-Transistor) and PIPE (Planarized Integration on the same PlanE)," IEEE 2008 Symposium on VLSI Technology Digest of Technical Papers, Jun. 17-19, 2008, pp. 122-123.

Kim et al., "Three-Dimensional NAND Flash Architecture Design Based on Single-Crystalline STacked ARray," IEEE Transactions on Electron Devices, vol. 59, No. 1, pp. 35-45, Jan. 2012.

Kim, "Abrasive for Chemical Mechanical Polishing. Abrasive Technology: Characteristics and Applications," Book Abrasive Technology: Characteristics and Applications, Mar. 2018, 20 pages.

Lai et al. "Highly Reliable MA BE-SONOS (Metal-Al2O3 Bandgap Engineered SONOS) Using a SiO2 Buffer Layer," VLSI Technology, Systems and Applications 2008, VLSI-TSA International Symposium on Apr. 21-23, 2008, pp. 58-59.

Lai et al., "A Multi-Layer Stackable Thin-Film Transistor (TFT) NAND-Type Flash Memory," Electron Devices Meeting, 2006, IEDM '06 International, Dec. 11-13, 2006, pp. 1-4.

Liu et al., "Parallelizing SRAM Arrays with Customized Bit-Cell for Binary Neural Networks," 55th ACM/ESDA/IEEE Design Automation Conference (DAC), Sep. 20, 2018, 4 pages.

Lue et al., "A Highly Scalable 8-Layer 3D Vertical-Gate (VG) TFT NAND Flash Using Junction-Free Buried Channel BE-SONOS Device", 2010 Symposium on VLSI Technology Digest of Technical Papers, pp. 131-132, Jun. 15-17, 2010.

Lue et al., "A Novel 3D AND-type NVM Architecture Capable of High-density, Low-power In-Memory Sum-of-Product Computation for Artificial Intelligence Application," IEEE VLSI, Jun. 18-22, 2018, 2 pages.

Lue et al., "A Novel Buried-Channel FinFET BE-SONOS NAND Flash with Improved Memory Window and Cycling Endurance", 2009 Symposium on VLSI Technology Digest of Technical Papers, p. 224-225.

Meena, et al., "Overview of emerging nonvolatile memory technologies," Nanoscale Reearch Letters 9:526, Oct. 2, 2014, 34 pages.

Merrikh-Bayat et al., "High-Performance Mixed-Signal Neurocomputing with Nanoscale Flowting-Gate Memory Cell Arrays," in IEEE Transactions on Neural Netowrks and Learning Systems, vol. 29, No. 10, Oct. 2018, pp. 4782-4790.

Minghao Qi, "ECE 695Q Lecture 10: Optical Lithography— Resolution Enhancement Techniques," may be found at https://nanohub.org/resources/15325/watch?resid=24507, Spring 2016, 35 pages.

Nowak et al., "Intrinsic fluctuations in Vertical NAND flash memories," 2012 Symposium on VLSI Technology, Digest of Technical Papers, pp. 21-22, Jun. 12-14, 2012.

Ohzone et al., "Ion-Implanted Thin Polycrystalline-Silicon High-Value Resistors for High-Density Poly-Load Static RAM Applications," IEEE Trans. on Electron Devices, vol. ED-32, No. 9, Sep. 1985, 8 pages.

Paul et al., "Impact of a Process Variation on Nanowire and Nanotube Device Performance", IEEE Transactions on Electron Devices, vol. 54, No. 9, Sep. 2007, p. 2369-2376.

Rincon-Mora, et al., "Bandgaps in the crosshairs: What's the trim target?" IEEE, The Georgia Tech Analog & Power IC Labroator, Oct. 18, 2006, 5 pages.

Rod Nussbaumer, "How is data transmitted through wires in the computer?", Aug. 27, 2015, pp. 1-3, https://www.quora.com/ How-is-data-transmitted-through-wires-in-the-computer (Year: 2015)— See Office Action dated Aug. 17, 2020 in U.S. Appl. No. 16/279,494 for relevance—no year provided by examiner.

Sakai et al., "A Buried Giga-Ohm Resistor (BGR) Load Static RAM Cell," IEEE Symp. on VLSI Technology, Digest of Papers, Sep. 10-12, 1984, 2 pages.

Schuller et al., "Neuromorphic Computing: From Materials to Systems Architecture," US Dept. of Energy, Oct. 29-30, 2015, Gaithersburg, MD, 40 pages.

Seo et al., "A Novel 3-D Vertical FG NAND Flash Memory Cell Arrays Using the Separated Sidewall Control Gate (S-SCG) for Highly Reliable MLC Operation," 2011 3rd IEEE International Memory Workshop (IMW), May 22-25, 2011, 4 pages.

Soudry, et al. "Hebbian learning rules with memristors," Center for Communication and Information Technologies CCIT Report #840, Sep. 1, 2013, 16 pages.

Tanaka et al., "Bit Cost Scalable Technology with Punch and Plug Process for Ultra High Density Flash Memory," VLSI Technology, 2007 IEEE Symposium on Jun. 12-14, 2007, pp. 14-15.

The Nikon eReview, "KLA-Tencor Research Scientist Emphasizes Stochastic Challenges at LithoVision 2018," may be found at https://nikonereview.com/2018/kla-tencor-research-scientist-emphasizes-stochastic-challenges-at-lithovision-Spring 2018, 7 pages.

Wang, Michael, "Technology Trends on 3D-NAND Flash Storage", Impact 2011, Taipei, dated Oct. 20, 2011, found at www.impact.org.tw/2011/Files/NewsFile/201111110190.pdf.

Webopedia, "DRAM—dynamic random access memory", Jan. 21, 2017, pp. 1-3, https://web.archive.org/web/20170121124008/https://www.webopedia.com/TERM/D/DRAM.html (Year: 2017)—See Office Action dated Aug. 17, 2020 in U.S. Appl. No. 16/279,494 for relevance—no year provided by examiner.

Webopedia, "SoC", Oct. 5, 2011, pp. 1-2, https://web.archive.org/web/20111005173630/https://www.webopedia.com/ TERM/S/SoC.

(56) References Cited

OTHER PUBLICATIONS html (Year: 2011)—See Office Action dated Aug. 17, 2020 in U.S. Appl. No. 16/279,494 for relevance—no month provided by examiner.

Webopedia, "volatile memory", Oct. 9, 2017, pp. 1-4, https://web.archive.org/web/20171009201852/https://www.webopedia.com/TERMN/volatile_memory.html (Year: 2017)—See Office Action dated Aug. 17, 2020 in U.S. Appl. No. 16/279,494 for relevance—no year provided by examiner.

Whang, SungJin et al. "Novel 3-dimensional Dual Control-gate with Surrounding Floating-gate (DC-SF) NAND flash cell for 1Tb file storage application," 2010 IEEE Int'l Electron Devices Meeting (IEDM), Dec. 6-8, 2010, 4 pages.

Y.X. Liu et al., "Comparative Study of Tri-Gate and Double-Gate-Type Poly-Si Fin-Channel Spli-Gate Flash Memories," 2012 IEEE Silicon Nanoelectronics Workshop (SNW), Honolulu, HI, Jun. 10-11, 2012, pp. 1-2 (MXIC 2261-1).

\* cited by examiner

RECONFIGURABLE AI SYSTEM

BACKGROUND

Field

The present invention relates to computation platforms for performing inference operations using artificial intelligence models, and models generated using machine learning, and more particularity to such platforms suitable for use in edge devices.

Description of Related Art

Systems executing computation models that are developed using machine learning, including artificial intelligence models, involve executing large numbers of arithmetic operations across input arrays using large arrays of coefficients. The coefficients are often referred to as weights. In a platform executing these models, off-chip memory access can be a limiting power and performance issue. Because of the size of the arrays of coefficients used in these models, on-chip memory can be insufficient, particularly in systems in which it is desirable to utilize more than one model.

It is desirable to provide a platform for performing inference operations addressing these issues.

SUMMARY

A reconfigurable inference platform is described suitable for implementation using a system in package "SiP" configuration. A platform as described herein can comprise a processor chip, a first memory chip suitable for storing arrays of weights, and a second memory chip suitable for storing collections of executable models. The platform can be implemented as a multichip module in a single package. The package can be mounted on a circuit board or other type of substrate, and connected to sensors and other components that can generate data consumed by the execution of the models, and consume data generated by execution of the models.

A processor chip in implementations of the platform can include a runtime processor core, an accelerator core and a processor-memory interface exposed on a chip-to-chip bonding surface of the processor chip. A first memory chip in implementations of the platform can include a nonvolatile, high capacity memory, such as 3D NAND flash memory. The first memory chip can store a collection of executable models of inference engines, where each executable model includes a set of weights to be applied in execution of the model, and in some cases a computation graph for the inference engine. A second memory chip can store at least the set of weights of a selected executable model. The second memory chip can comprise a nonvolatile, random access memory, such as phase change memory. The second memory chip can include a memory-processor interface exposed on a surface of the second memory chip, and complementary to the processor-memory interface on the processor chip. Direct vertical connections such as via-to-via connections, between the processor-memory interface and the memory-processor interface are provided, which enable low power, high throughput, and low latency transfer of data between the chips in support of execution of the selected model.

In an example described herein, the processor chip and the second memory chip are stacked and disposed on an interposer. The first memory chip is also disposed on the interposer which includes interconnection wiring forming at least part of a data path between the first memory chip and the second memory chip. The processor chip can include an input/output interface in addition to the processor-memory interface, and the data path can include a connection from the interconnection wiring of the interposer to the input/output interface of the processor chip.

In an example described herein, the processor chip has access to instruction memory, which can be included on the processor chip or accessible in off-chip storage, storing instructions to perform a runtime procedure. The runtime procedure can include selecting an executable model from the collection of executable models stored in the first memory chip, loading a computation graph for the selected model including configuring the accelerator core on the processor chip, transferring the set of weights of the selected model to the second memory chip, and executing the selected model. Also, the runtime procedure can include changing the model in response to a control event in the field. Thus, the runtime procedure can include changing the selected model to a different model in the collection of executable models, loading a computation graph for the different model including configuring the accelerator core, transferring the set of weights of the different model to the second memory chip, and executing the different model.

An example of a reconfigurable inference method is described comprising providing a processor chip including a runtime processor core, an accelerator core, on-chip memory and a processor-memory interface exposed on a chip-to-chip bonding surface of the processor chip, storing a collection of executable models of an inference engine for a model implemented by machine learning in a first memory chip accessible by the processor chip, each model including a set of weights to be applied in execution of the model, selecting in response to a control event an executable model from the collection of executable models stored in the first memory chip, loading a computation graph for the selected model including configuring the accelerator core, and transferring the set of weights of the selected executable model from the first memory chip to a second memory chip, the second memory chip including a memory-processor interface disposed on a surface the second memory chip and complementary to the processor-memory interface, and executing the selected executable model using direct vertical connections between the processor-memory interface and memory-processor interface.

Other aspects and advantages of the present invention can be seen on review of the drawings, the detailed description and the claims, which follow.

DETAILED DESCRIPTION

A detailed description of embodiments of the present technology is provided with reference to the FIGS. 1-5.

Figure 1:
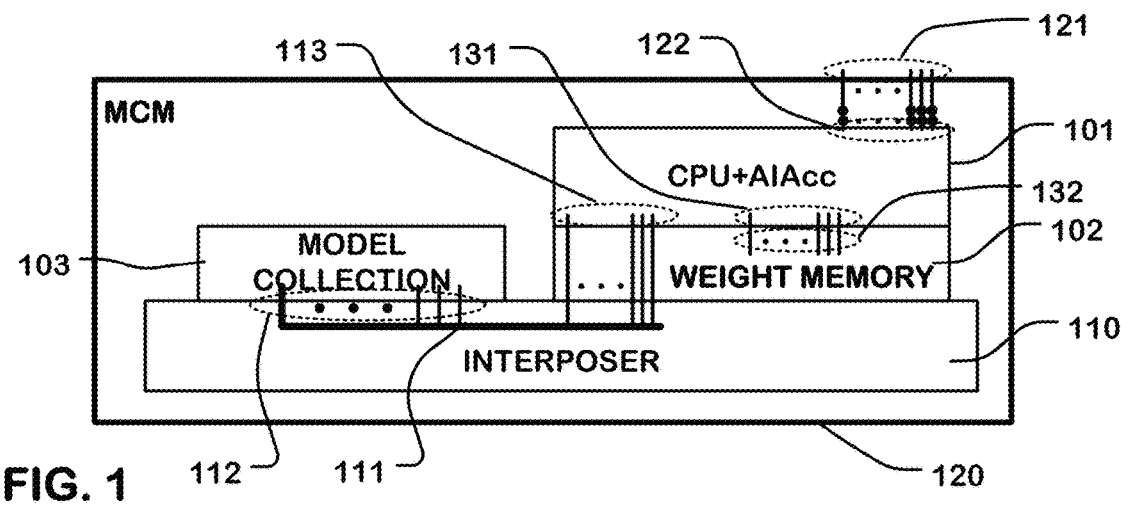
FIG. 1 is an illustration of a multichip module including an inference platform as described herein.

FIG. 1 illustrates a reconfigurable inference platform that includes a processor chip 101, a first memory chip 103 (model collection), and the second memory chip 102 (weight memory). In this example, the processor chip 101 and the second memory chip 102 are stacked, and the combination of the processor chip 101 stacked with second memory chip 102, and the first memory chip 103 is mounted on an interposer 110. The assembly is configured as a multichip module 120 in a single package.

The processor chip 101 can include a runtime processor core (e.g. CPU) and an accelerator core, such as an artificial intelligence accelerator (e.g. AIAcc) or a neuron processing unit. The processor chip 101 includes a chip-to-chip bonding surface on which a processor-memory interface 131 is exposed for connection to the second memory chip 102. The second memory chip includes a memory-processor interface 132 exposed on a surface of the second memory chip, and complementary to the processor-memory interface 131 on the processor chip 101. In this example, direct vertical connections are provided between the processor-memory interface and the memory-processor interface. The direct vertical connections can comprise copper via-to-via conductors or other chip-to-chip contact technologies suitable for high speed, low latency, and low power communication between the chips.

In this example, processor chip 101 includes an input/output interface 113 disposed on the surface of the chip 101. The input/output interface 113 is connected to vertical connectors such as through silicon via TSV connections to interconnection wiring 111 on the interposer 110.

The first memory chip 103 includes an interface 112 for connection to the interconnection wiring 111 on the interposer 110.

Thus, interconnection wiring 111 provides part of the data path between the first memory chip and the second memory chip through the processor chip 101.

In the example illustrated in FIG. 1, the processor chip 101 includes another input/output interface 122 for connection to external contact structures 121 of the multichip module 120.

Figure 2:
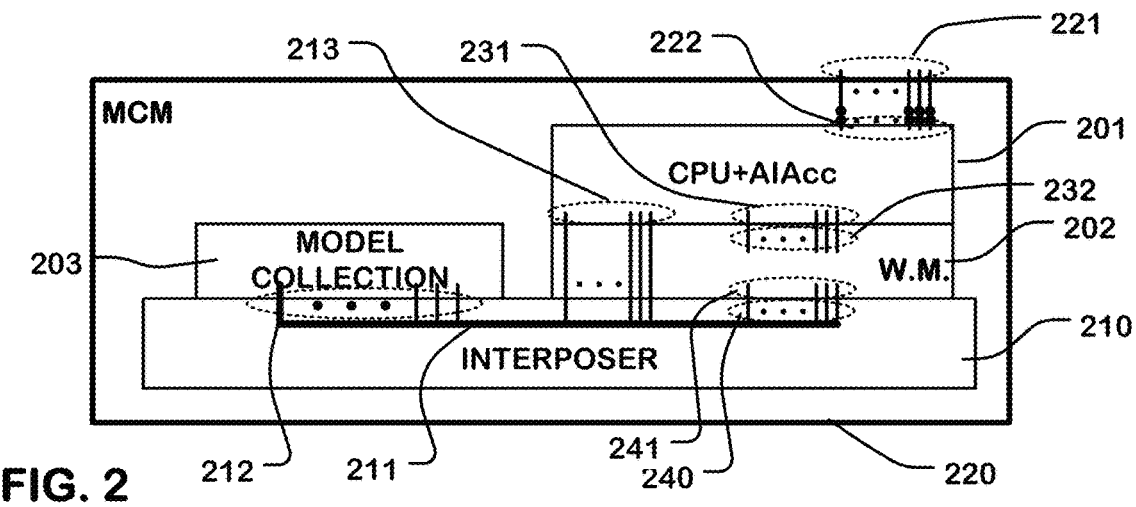
FIG. 2 is an illustration of another embodiment of a multichip module including an inference platform as described herein.

FIG. 2 illustrates another configuration of an inference engine as described herein. This configuration includes a processor chip 201, a first memory chip 203 (model collection), and the second memory chip 202 (weight memory). In this example, the processor chip 201 and the second memory chip 202 are stacked, and the combination of the processor chip 201 stacked with the second memory chip 203 and the first memory chip 202 is mounted on an interposer 210. The assembly is configured as a multichip module 220 in a single package.

The processor chip 201 can include a runtime processor core (e.g. CPU) and an accelerator core, such as an artificial intelligence accelerator (e.g. AIAcc) or a neuron processing unit. The processor chip 201 includes a chip-to-chip bonding surface on which a processor-memory interface 231 is exposed for connection to the second memory chip 202. The second memory chip includes a memory-processor interface 232 exposed on a surface of the second memory chip, and complementary to the processor-memory interface 231 on the processor chip 201. In this example, direct vertical connections at the surfaces are provided between the processor-memory interface and the memory-processor interface. The direct vertical connections can comprise very short length copper via-to-via conductors or other chip-to-chip contact technologies suitable for high speed, low latency, and low power communication between the chips.

In this example, processor chip 201 includes an input/output interface 213 disposed on the surface of the chip 201. The input/output interface 213 is connected to vertical connectors such as through silicon via TSV connections to interconnection wiring 211 on the interposer 210.

Also, the second memory chip 202 includes an input/output interface 241 exposed on the surface opposite the processor chip 201, which connects to complementary interface 240 on the interposer 210, for connection to the interconnection wiring 211 of the interposer 210.

The first memory chip 203 includes an interface 212 for connection to the interconnection wiring 211 on the interposer 210.

Thus, interconnection wiring 211 provides part of the data path between the first memory chip and the second memory chip through the interposer interconnection wiring 211, as an alternative to a data path through the processor chip 201.

In the example illustrated in FIG. 2, the processor chip 201 includes another input/output interface 222 for connection to external contact structures 221 of the multichip module 220.

Figure 3:
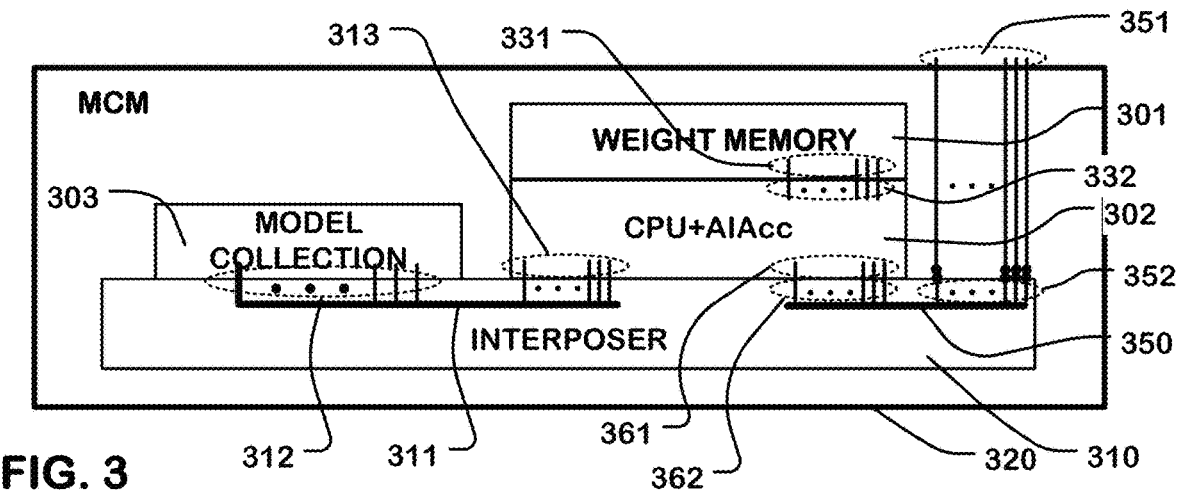
FIG. 3 is an illustration of yet another embodiment of a multichip module including an inference platform as described herein.

FIG. 3 illustrates another configuration of an inference engine as described herein. This configuration includes a processor chip 302, a first memory chip 303 (model collection), and the second memory chip 301 (weight memory). In this example, the processor chip 302 and the second memory chip 301 are stacked, and the combination of the processor chip 302 stacked with the second memory chip 301 and the first memory chip 303 is mounted on an interposer 310. In this example, the processor chip 302 is between the second memory chip 301 and the interposer 310. The assembly is configured as a multichip module 320 in a single package.

The processor chip 302 can include a runtime processor core (e.g. CPU) and an accelerator core, such as an artificial intelligence accelerator (e.g. AIAcc) or a neuron processing unit. The processor chip 302 includes a chip-to-chip bonding surface (top surface) on which a processor-memory interface 332 is exposed for connection to the second memory chip 301. The second memory chip 301 includes a memory-processor interface 331 exposed on a surface of the second memory chip (bottom surface), and complementary to the processor-memory interface 332 on the processor chip 302. In this example, direct vertical connections are provided between the processor-memory interface and the memory-processor interface. The direct vertical connections can comprise copper via-to-via conductors or other chip-to-chip contact technologies suitable for high speed, low latency, and low power communication between the chips.

In this example, processor chip 302 includes an input/output interface 313 disposed on the bottom surface of the chip 302. The input/output interface 313 is connected to vertical connectors, which connect to interconnection wiring 311 on the interposer 310.

Also, the processor chip 302 includes an input/output interface 361 exposed on the bottom surface opposite the second memory chip 301, which connects to a complementary interface 362 on the interposer 310, for connection to the interconnection wiring 350 of the interposer 310.

The first memory chip 303 includes an interface 312 for connection to the interconnection wiring 311 on the interposer 310.

Thus, interconnection wiring 311 provides part of the data path between the first memory chip and the second memory chip through the interposer interconnection wiring 311, and through the processor chip 302.

The interposer 310 includes an interface 352 for connection of the interconnection wiring 350 of the interposer (which can be connected to or part of the interconnection wiring 311 of the interposer). Wiring connections are provided from the interface 352 to external contact structures 351 of the multichip module 320.

In other embodiments, the interface 352 can be replaced or supplemented by an interface or interfaces on the side or bottom surfaces of the interposer.

FIGS. 1-3 provide example arrangements of a platform as described herein, showing varieties of configurations of the chips and connections among the chips, the interposer and external contacts of the package. Other arrangements can be implemented as suits a particular need.

Figure 4:
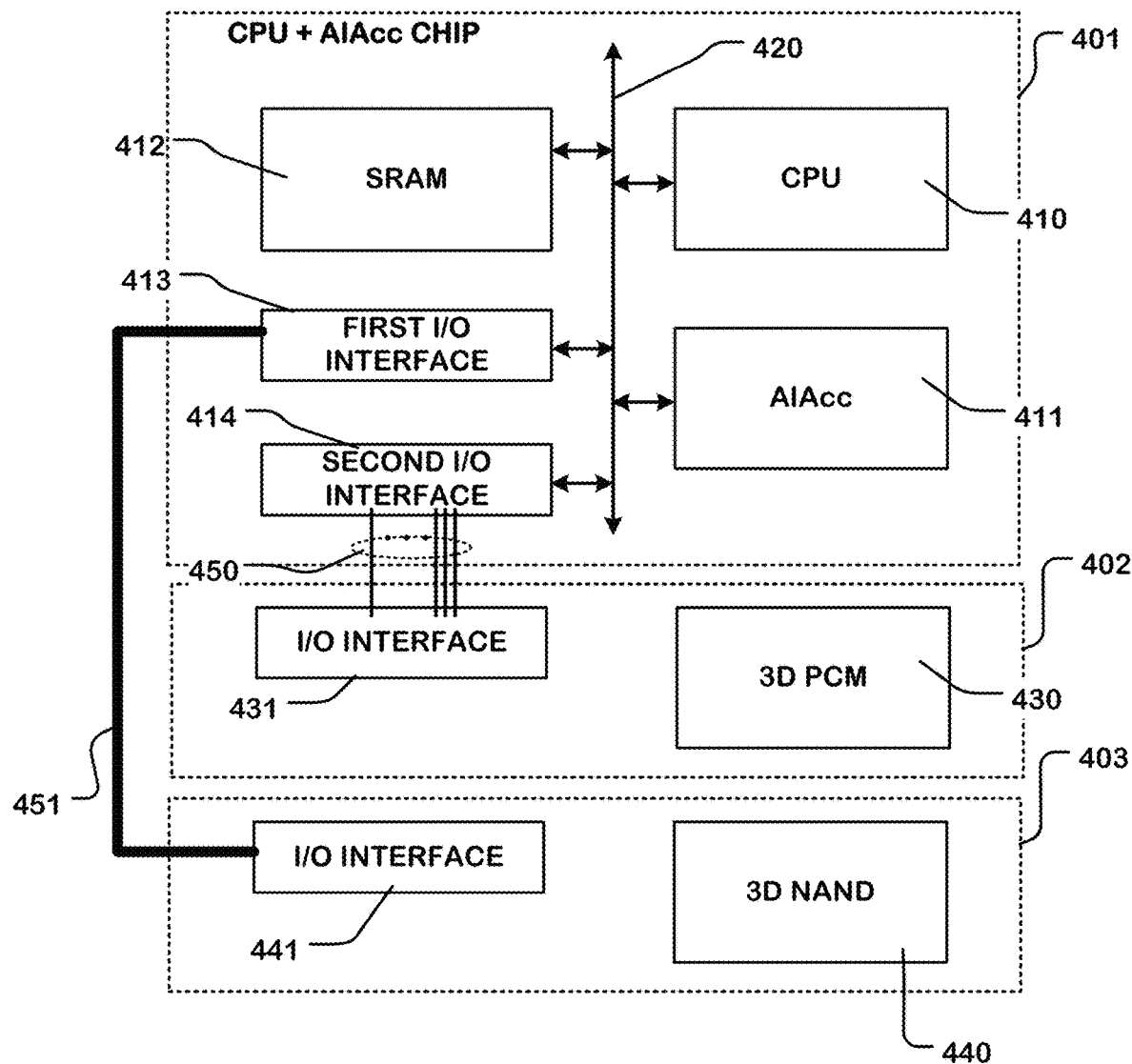
FIG. 4 is a simplified functional block diagram of an inference platform as described herein.

FIG. 4 is a simplified functional block diagram of a platform implemented as described with reference to FIGS. 1-3. The platform includes a processor chip 401, a first memory chip 403, and a second memory chip 402. The processor chip 401 in this example includes a CPU or processor core 410, accelerator core 411, on-chip memory 412, such as SRAM which can be used as working memory and as a cache memory, a first I/O interface 413 and a second I/O interface 414. A bus system 420 provides for intra-chip communications among the components.

The first memory chip 403 in this example comprises a high capacity, nonvolatile memory 440 such as 3D NAND implemented using charge trapping storage technology, for example. The first memory chip 403 includes a first memory I/O interface 441 for off-chip communications. The first memory I/O interface 441 can comprise a high-speed serial port, such as an SPI compatible port, or a parallel port, depending on the particular implementation of the memory chip utilized. A data path 451 is provided in this example between the first memory I/O interface 441, and the first I/O interface 413 on the processor chip 401.

The second memory chip 402, in this example, comprises a high-speed, random-access nonvolatile memory 430, such as 3D phase change storage technology. In other examples, the second memory chip 402 can comprise NOR flash memory using charge trapping storage technology, or other suitable random-access technologies like resistive RAM (e.g. metal oxide memory), magnetic RAM, Ferroelectric RAM and so on.

The second memory chip 402 includes a memory I/O interface 431, for off-chip communications directly connected by vertical interconnections 450 to the second I/O interface 414 on the processor chip 401.

DRAM is an option to bond into the SiP in case on-chip SRAM is not big enough. Thermal (heat) management can used to guarantee data retention.

An accelerator core (e.g. accelerator core 411), as the term is used herein, is a configurable logic circuit including components designed or suitable for execution of some or all of the arithmetic operations of an inference model. Configuration of the accelerator core can include loading a set of weights used in the inference model, or parts of the set of weights. In some embodiments, configuration of the accelerator core can include loading some or all of the of the computation graphs of the inference model to define the sequence and architecture of the operation of the inference model. The inference model can comprise a computation graph of a deep learning neural network, in some examples having a plurality of fully connected and partially connected layers, activation functions, normalization functions and so on.

An accelerator core can be implemented using configurable logic, like arrays of configurable units used in field programmable gate arrays for example, in which compiled computation graphs are configured using bit files. An accelerator core can be implemented using a hybrid of data flow configurable logic and sequential processing configurable logic.

The runtime processor core (e.g. CPU 410) can execute a runtime program to coordinate operation of the accelerator core to accomplish real time inference operations, including data input/output operations, loading computation graphs, moving the set of weights to be applied in the inference operation into and out of the accelerator core, delivering input data to the accelerator core, and performing parts of the computation graphs.

Figure 5:
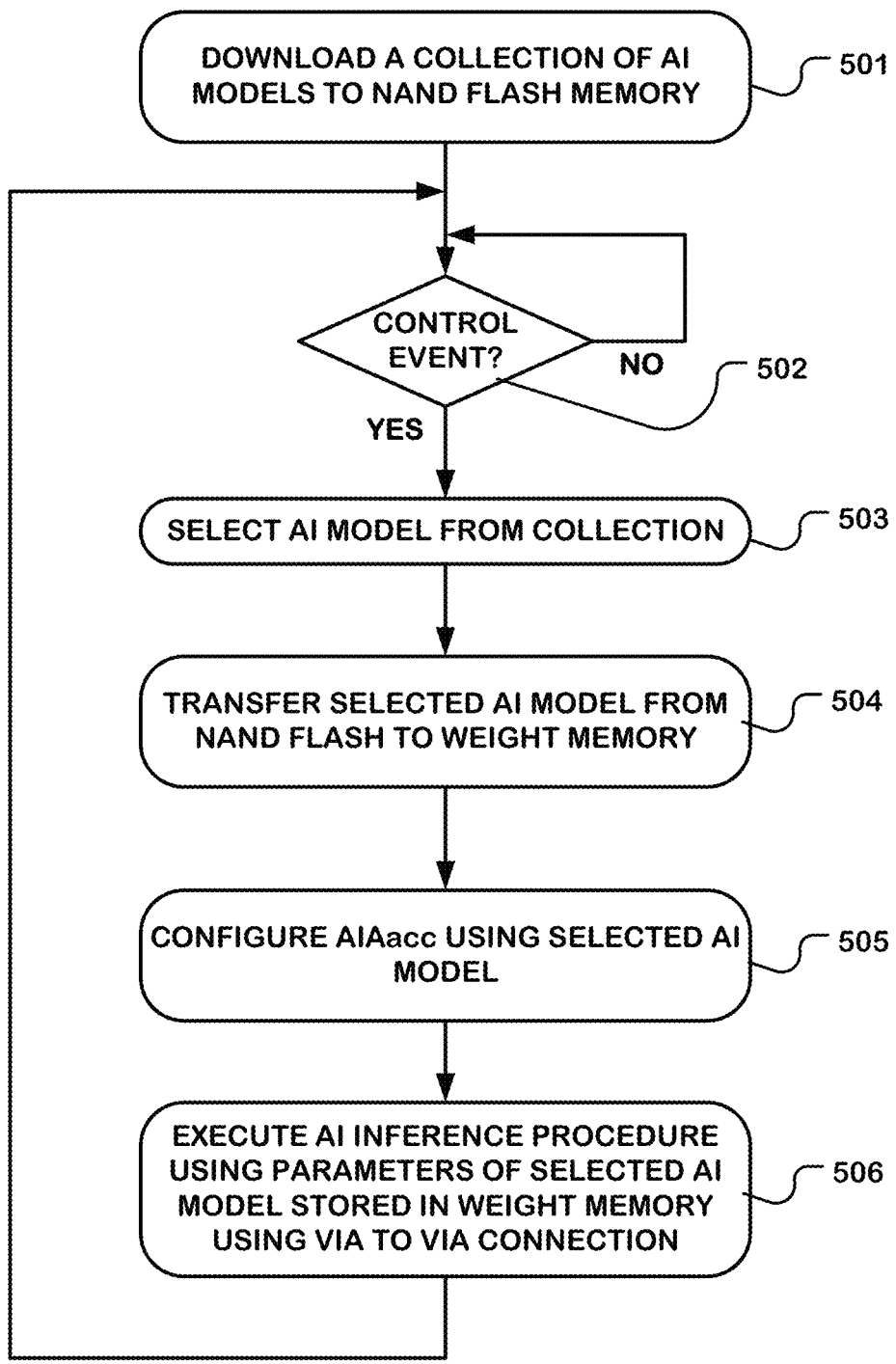
FIG. 5 is a flowchart of a runtime procedure which can be executed by an inference platform as described herein.

FIG. 5 is a flowchart illustrating an example of logic of a procedure executed by an inference platform, such as platforms described with reference to FIGS. 1-4. The logic can be implemented using computer programs stored in memory, such as the SRAM on-chip memory 412, or other memory accessible by the CPU 410. In this example, the procedure includes downloading a collection of executable artificial intelligence models from an external source, such as a network, and loading the collection in the high capacity NAND flash memory on the platform (501). During runtime, the procedure waits for a control event (502). The control event can include a reset, an expiration of a timer, a message received from a communication network or other external source, data generated by execution of an inference engine in the processor chip itself, or other signals. As long as no control event is detected, the procedure loops.

When the control event is detected, the procedure includes selecting an artificial intelligence model from the collection stored in the NAND flash memory (503). The selected model, or at least a set of weights of the selected model, is then transferred from the NAND flash memory to the weight memory (504). The procedure includes configuring the accelerator core using parameters of the selected model read from the NAND flash memory (505). After loading the weights and configuring the accelerator core, the procedure includes executing an inference procedure using the parameters of the selected models stored in the weight memory, including transferring parameters such as weights, using the direct vertical connections between the processor chip 401, and the second memory chip 402 (506).

Thus, the procedure of FIG. 5 includes a procedure to select an executable model from the collection of executable models stored in the first memory chip to load a computation graph for the selected model including configuring the accelerator core, to transfer the set of weights of the selected model to the second memory chip, and to execute the selected model. Also, as shown in FIG. 5, after executing or beginning to execute the selected model, the process loops to step 502, to wait for a next control event. Upon detection of the next control event, the steps 503 to 506 are traversed, and can include changing the selected model to a different model in the collection of executable models, loading a computation graph for the different model including configuring the accelerator core, transferring the set of weights of the different model to the second memory chip, and executing the different model.

It will be appreciated with reference to FIG. 5, that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

An SiP platform described, in which one or more 3D NAND chip(s) store a collection including multiple different AI models (computation graph and weights), a weight memory chip(s) stores the weights of a selected AI model, and a processor chip which can be a special purpose AI logic chip (CPU+AI accelerator) is included with the memory system to execute the selected AI model parameters (e.g. weights), hyperparameters (e.g. neural network computation graphs or architectural details) needed by the CPU/NPU (e.g. layers, normalization functions, activation functions, etc.)

Inter-chip bonding between the AI logic chip and the weight memory chip can be Via-to-Via Cu bonding or other 3D (2.5 D) bonding technologies.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A reconfigurable inference platform, comprising:
a processor chip including a runtime processor core, an accelerator core, on-chip memory and a processor-memory interface exposed on a chip-to-chip bonding surface of the processor chip;
a first memory chip accessible by the processor chip to store a collection of executable models of an inference engine, each model including a set of weights to be applied in execution of the model;
a second memory chip to store the set of weights of a selected executable model, the second memory chip including a memory-processor interface exposed on a surface of the second memory chip and complementary to the processor-memory interface; and
direct vertical connections between the processor-memory interface and memory-processor interface,
wherein the processor chip and the second memory chip are stacked and disposed on an interposer, and the first memory chip is disposed on the interposer, the interposer including interconnection wiring forming part of a data path between the first memory chip and the second memory chip, and
wherein the processor chip includes a second input/output interface, the data path including a connection from the interconnection wiring of the interposer to the second input/output interface on the processor chip.

2. The platform of claim 1, wherein the direct vertical connections comprise via-to-via connections.

3. The platform of claim 1, wherein the processor core has access to instruction memory, storing executable instructions to perform a procedure including:
selecting an executable model from the collection of executable models stored in the first memory chip, loading a computation graph for the selected model including configuring the accelerator core, transferring the set of weights of the selected model to the second memory chip, and executing the selected model.

4. The platform of claim 1, wherein the processor core has access to instruction memory, storing executable instructions to perform a procedure in response to a control event, including changing the selected model to a different model in the collection of executable models, load a computation graph for the different model including configuring the accelerator core, transferring the set of weights of the different model to the second memory chip, and executing the different model.

5. The platform of claim 1, wherein the interposer is below the second memory chip, and the processor chip is disposed above the second memory chip.

6. The platform of claim 1, wherein the interposer is below the processor chip and the second memory chip is disposed above the processor chip.

7. The platform of claim 1, wherein the first memory chip comprises a charge trapping, NAND-architecture memory, and the second memory chip comprises nonvolatile random access memory.

8. The platform of claim 7, wherein the nonvolatile random access memory is phase change memory.

9. The platform of claim 7, wherein the nonvolatile random access memory is a charge trapping, NOR-architecture memory.

10. The platform of claim 1, wherein the processor chip, first memory chip and second memory chip are disposed in a multichip package.

11. A reconfigurable inference method, comprising:
providing a processor chip including a runtime processor core, an accelerator core, on-chip memory and a processor-memory interface exposed on a chip-to-chip bonding surface of the processor chip;
storing a collection of executable models of an inference engine for a model implemented by machine learning in a first memory chip accessible by the processor chip, each model including a set of weights to be applied in execution of the model;
selecting in response to a control event an executable model from the collection of executable models stored in the first memory chip, loading a computation graph for the selected model including configuring the accelerator core, and transferring the set of weights of the selected executable model from the first memory chip to a second memory chip, the second memory chip including a memory-processor interface disposed on a surface the second memory chip and complementary to the processor-memory interface; and
executing the selected executable model using direct vertical connections between the processor-memory interface and memory-processor interface,
wherein the processor chip and the second memory chip are stacked and disposed on an interposer, and the first memory chip is disposed on the interposer, the interposer including interconnection wiring forming part of a data path between the first memory chip and the second memory chip, and
wherein the processor chip includes a second processor-memory interface, and including transferring data from the first memory chip to the processor chip on a data path including a connection from the interconnection wiring of the interposer to the second processor-memory interface on the processor chip.

12. The method of claim 11, wherein the direct vertical connections comprise via-to-via connections.

13. The method of claim 11, including changing, in response to a second control event, the selected model to a different model in the collection of executable models, loading a computation graph for the different model including configuring the accelerator core, transferring the set of weights of the different model to the second memory chip, and executing the different model.

14. The method of claim 11, wherein the first memory chip comprises a charge trapping, NAND-architecture memory, and the second memory chip comprises nonvolatile random access memory.

15. The method of claim 14, wherein the nonvolatile random access memory is phase change memory.

16. A reconfigurable inference platform, comprising:
- a processor chip including a runtime processor core, an accelerator core, on-chip memory and a processor-memory interface exposed on a chip-to-chip bonding surface of the processor chip;
- a first memory chip accessible by the processor chip to store a collection of executable models of an inference engine, each model including a set of weights to be applied in execution of the model;
- a second memory chip to store the set of weights of a selected executable model, the second memory chip including a memory-processor interface exposed on a surface of the second memory chip and complementary to the processor-memory interface; and
- direct vertical connections between the processor-memory interface and memory-processor interface,
- wherein the processor chip and the second memory chip are stacked and disposed on an interposer, and the first memory chip is disposed on the interposer, the interposer including interconnection wiring forming part of a data path between the first memory chip and the second memory chip, and
- wherein (i) the interposer is below the second memory chip and the processor chip, and (ii) the processor chip is disposed above the second memory chip or the second memory chip is disposed above the processor chip.

* * * * *